United States Patent

[11] 3,625,249

| [72] | Inventor | James F. Karr<br>38 Joe De Diego, Mayaguez, P.R. 00708 |
|---|---|---|
| [21] | Appl. No. | 14,496 |
| [22] | Filed | Feb. 26, 1970 |
| [45] | Patented | Dec. 7, 1971 |

[54] ECCENTRIC DAMPER-TYPE VALVE FOR CONTROLLED ACTION
9 Claims, 6 Drawing Figs.

[52] U.S. Cl. .................................................. 137/527,
137/607, 137/609, 137/625.4
[51] Int. Cl. ...................................................... F16k 3/04,
F16k 3/22
[50] Field of Search............................................ 137/607,
609, 118, 527, 111, 625.41, 625.4; 251/304, 308

[56] References Cited
UNITED STATES PATENTS
| 3,059,897 | 10/1962 | Jensen........................ | 251/308 |
| 3,084,711 | 4/1963 | Phillips......................... | 137/607 |
| 3,260,502 | 7/1966 | Plumer......................... | 251/308 |
| 3,410,422 | 11/1968 | Carpentier ................... | 137/609 |

Primary Examiner—Laverne D. Geiger
Assistant Examiner—William H. Wright
Attorney—Hyman Jackman ABSTRACT: An eccentric damper-type valve disposed across a flow line and which is adapted to open under pressure of the flow on the larger of the two uneven sections of the valve on either side of the valve shaft, whereby the total upstream pressure on the valve being unequal on the opposite sides of the shaft, the resulting differential of pressures enables manual or mechanical (automatic or not) operation of the valve with a lower expenditure of force than would be required under comparable conditions, to open or otherwise operate a completely unbalanced check valve.

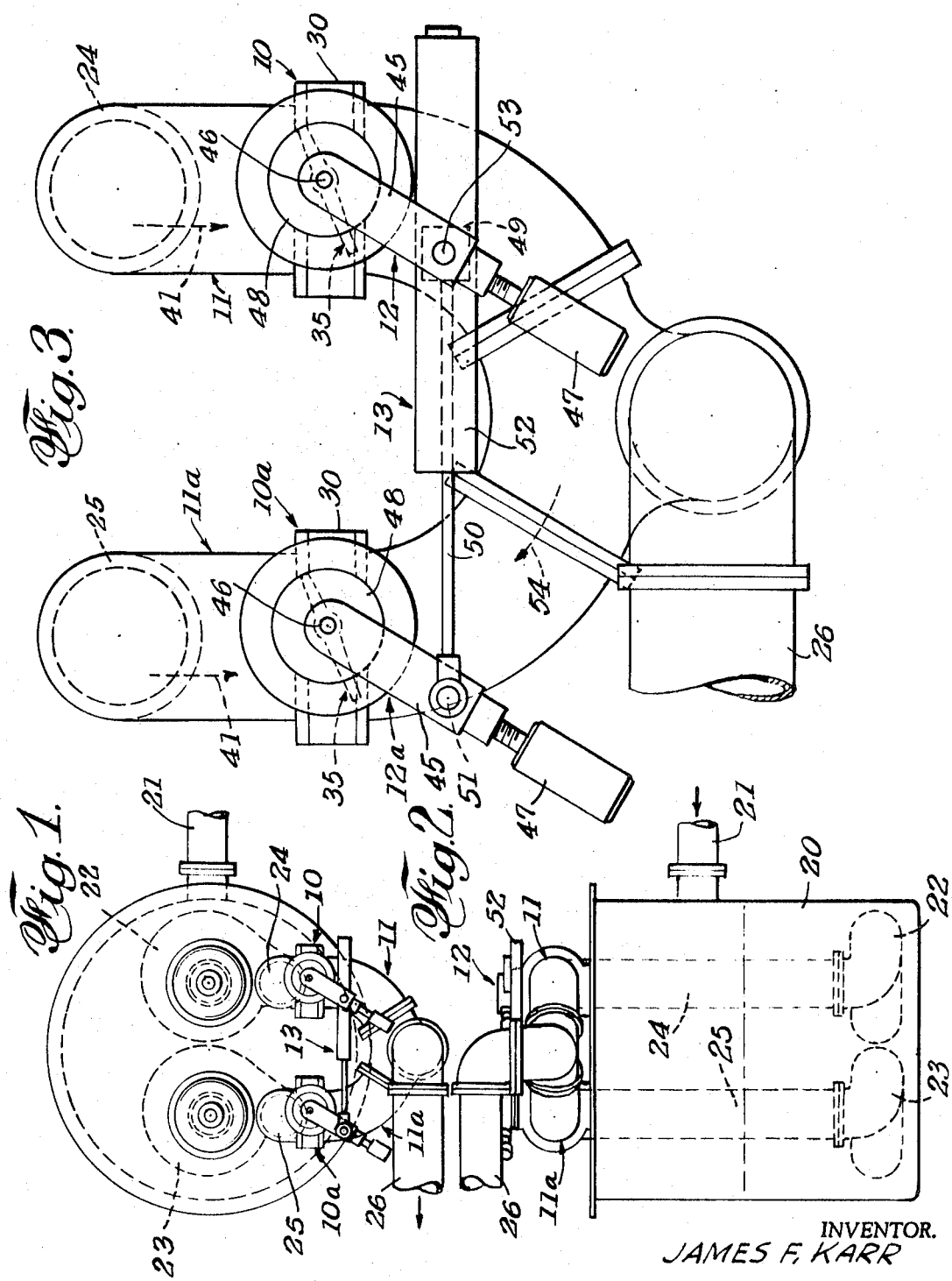

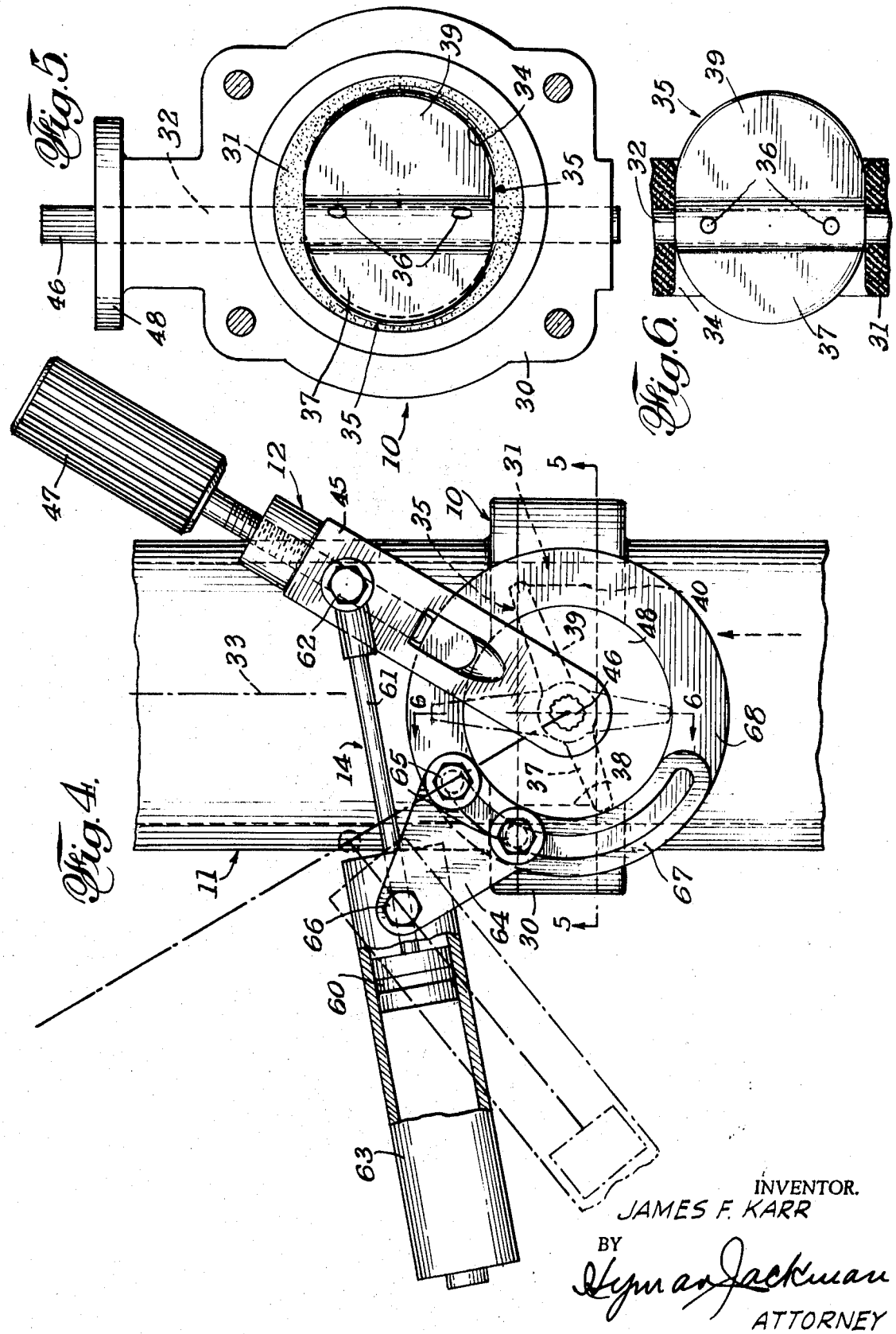

3,625,249

ECCENTRIC DAMPER-TYPE VALVE FOR CONTROLLED ACTION

BACKGROUND OF THE INVENTION

1. Field of the Invention

In a flow line such as a conduit or pipe, where it is desired that the flow open the line, and that the power required to open or close the line against or with the flow be similarly lower than are conventionally required. An example of installation adapted to use the present damper-type valves are single and duplex sewage injector pumps wherein the controlled action of the valves will make the pumps self-cleaning, free from stoppage, and eliminate surge and water hammer as well as the resulting excess of noise and damage to piping systems.

2. Description of the Prior Art

The same may be exemplified by a butterfly valve symmetrically formed and rotational on an axis transverse to a resilient circular seat in a flow line. Such symmetrical valves cannot be opened by flow in the line, and conventional type check valves would require substantial power to operate them since such power must be great enough to offset the total pressure of the flow in the line, whether the operating means used are air cylinders, electric actuators, or other actuator means.

SUMMARY OF THE INVENTION

The present means comprises, generally, an eccentric damper-type valve 10 disposed in a fluid passing pipe 11, external operating lever means 12 for operating said valve, and dashpot-controlled linkage 13 for connecting the lever means 12 with a second valve 10a in a second pipe 11a, and the lever means 12a thereof, to control the opening and closing speeds of said valves. An alternative form of the invention comprises a valve 10 in a pipe 11, provided with external means 12 as before and dashpot-controlled linkage 14 to control the openings and closing speed of the valve.

The invention has for an object to provide a valve for controlled action of the general character above referred to.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following specification merely describes, preferred embodiments of the present invention, which are given by way of illustration or example only.

In the drawings, like reference characters designate similar parts in the several views.

BRIEF DESCRIPTION OF THE DRAWINGS

FIG. 1 is a plan view of a generally conventional sump pump of the duplex type and showing means embodying one form of eccentric damper-type valves for controlled action according to the present invention.

FIG. 2 is a front elevational view thereof.

FIG. 3 is an enlarged plan view of said means, the valves being shown in flow-closing position.

FIG. 4 is a further enlarged plan view of such means embodying a single valve installation which is adapted to be used in a single sewage ejector pump.

FIG. 5 is a cross-sectional view as taken on the line 5—5 of FIG. 4, the eccentric valve of said means being shown in flow-closing position.

FIG. 6 is a longitudinal sectional view as taken on the line 6—6 of FIG. 4, the valve being shown in open position.

DESCRIPTION OF THE PREFERRED EMBODIMENTS

The sump pump shown in FIG. 1 conventionally comprises a pit 20 having a drain inlet 21, two sewage ejector float-controlled pumps 22 and 23 disposed in the lower end of said pit, and respective pump discharge pipes 24 and 25 extending upwardly from said pumps and joining to form a single sewage discharge pipe 26. The previously mentioned pipes 11 and 11a in the form of the invention shown in FIG. 3, join the respective pump discharge pipes 24 and 25 to sewage discharge pipe 26. The pipe 11, shown in the form of FIG. 4, joins the discharge pipe of the single pump of a single valve installation with the sewage discharge pipe of such an installation. It is the pipes 11 and 11a with which the present eccentric valves 10 are provided and which control flow in said pipes, as will hereafter be seen.

Each valve 10 and 10a comprises a valve housing 30 fitted with a resilient ring seat 31 around the flow-through pipe 11, a shaft 32 extending transversely through said housing 30 offset from the axis 33 of the pipe, the shaft 32 being shown as extending across a transversely enlarged opening 34 in the ring seat, and a valve vane 35 secured to said shaft, as by screws or rivets 36, the vane, due to the offset relationship of the axis 33 and the shaft 32, comprising a smaller vane part 37 that has a flow-closing relationship with the portion 38 of the opening 34 of the ring seat, and a larger vane part 39 that has a flow-closing relationship with the opposite portion 40 of the ring seat.

In practice, the rounded edges of the vane parts 37 and 39 preferably have lateral engagement with ring parts 38 and 40 so that, in flow-closing position, the vane is disposed at an acute angle to the axis of the pipe 11.

The above-described relationship of the valve seat ring 31 and vane 35 is preferred, although a truly transverse flow-closing position of the vane may be employed. The former, however, minimizes wedging engagement of ring and vane, yet enabling efficient shut off positioning of the vane.

It will be clear that such a valve vane 35, when closed, will open under flow pressure in the direction of arrow 41 when the same has achieved a certain minimum force, for the reason that, although the unit pressures on said respective parts, are greater on the larger part 39 than on the smaller part 37. The resulting differential of pressures on the vane is substantially smaller than the pressure of the flow and is of much lower value than would be required to open a conventional type check valve seat against the pressure of the flow.

It will be evident that the above-described vane, in addition to opening with the force of the flow, as above, may be as efficiently opened or closed against the flow by a manual or mechanical force with an expenditure of power substantially smaller than the pressure of the flow in the pipe. Also, whereas the forces necessary to operate a conventional type check valve must be great enough to overcome the full pressure of the flow, the present eccentric vane design, with a small expenditure of power, enables making duplex sewage ejector and sump pumps self-cleaning, and free from stoppage, surgeless and free of water hammer. Also, excessively noisy operation of and damage to the piping systems of such installations are obviated.

The operating lever means 12 for controlling the valves 10 shown in FIG. 3, comprise a lever 45 fixedly connected to a projecting end 46 of each valve vane 35 and an adjustable handle portion 47 for locking each respective lever 45 to a fixed disc 48 on the valve housing 30, thereby locking the vanes 35 in fixed positions, either open or closed in relation to their respective seat rings 31.

The linkage 13 for connecting the two levers 45 of FIG. 3 is shown as fluid bypassing plunger 49 on the end of a rod 50 pivotally connected to one of the levers 45 at 51, and a dashpot cylinder 52, in which said plunger operates and which, by its midportion, is connected by a pivot 53 to the other of said levers 45.

It will be noted from the foregoing that in an installation, as for a duplex sump pump or the like, the only connection between the two handles 45 comprises the means 13 and that the movement of one valve vane 35, by flow pressure thereon or by the handle 45 thereof, when unlocked, transmits such movement to the other handle 45 and to the vane 35 affixed thereto.

Operation of a Duplex Pump Installation

Referring to FIGS. 1, 2 and 3, when the water level in the pit 20 rises so the float-controlling operation of the pump 22, for instance, starts up and causes its valve 10 to open under the resultant pressure of flow on the pipe 11, the dashpot-controlled leakage 13 will simultaneously open the valve 10a in the pipe 11a thereby causing the discharge of said pump 22 to enter the pipe 25 in the direction of the arrow 54 to back flush and clean the pump 23 at the lower end of pipe 25. Such back flow also agitates the liquid in the sump pit 20. Such opening of the valves 10 and 10a constitutes a bypass flow that prevents surge in the piping system when the pump 22 starts up.

The dashpot linkage, by its softened and slowed action between the plunger 49 and cylinder 52, allows the check valve 10a, from its opened position, to close slowly and prevent noisy water hammer and resultant damage to piping in the system.

When the water level in the pit 20 lowers and through the float controlling the same, causes the pump 22 to stop operating, the dashpot linkage 13 allows the check valve 10 to close slowly from the mentioned open position in the soft and slowed matter above mentioned, resulting in the head of water in pipe 24 to drain downwardly and backwashing the pump 22, thereby completing the cycle of operation of the two pumps 22 and 23 and their respective valves 10 and 10a.

A conventional reversing switch controlling the alternate operation of the pumps 22 and 23 will, when the level in the pit rises, start up the pump 23 and cause a cycle of operation that is the reverse of that above-described, i.e., backwashing pump 22 first and then pump 23.

In the single pump installation, as in FIG. 4, the operating arm or lever 45 which is affixed, as before, to the end 46 of the vane 35 of valve 10, is connected to the dashpot linkage 14. The latter is shown as a plunger 60 on the end of a rod 61 that, at one end, is pivotally connected at 62 to the lever 45, a dashpot cylinder 63 in which said plunger 60 operates, and a bracket 64, that has an adjustable connection by bolts 65 on the valve 10 and is connected as by a pivot bolt 66 to the cylinder 63. The bracket 64 has an arcuate extension 67 that enables the same to be adjusted relative to the fixed plate 68 that mounts the operating lever 45 so that the limit stops for maximum opening and closing of the valve 10. The mentioned bolts 65 lock such adjustment.

OPERATION OF A SINGLE PUMP INSTALLATION

Most of the above advantages are achieved in the single pump installation shown in FIG. 4, wherein the operating arm or lever 45, through the dashpot linkage 14, is connected to the fixed position bracket 64, and not to a second valve, as was the case in the duplex pump installation. The dashpot linkage 14 in this form of the invention, softens the operation of the valve 10 with the benefits hereinabove mentioned.

In the light of the foregoing operations, it will be realized that the requirement for excessively high operative forces to cause conventional type check valve seats to move responsive to water pressures or mechanically originated operative forces, even with dashpot linkage, as herein disclosed, results in an impracticable method that, however, is simply overcome by combining such linkage with the unbalanced or eccentric valves shown in FIGS. 5 and 6.

An important feature of the invention is that installation of the means herein described would require no special rough-in elevations or locations of waste lines into the pit 20. The same can as easily be installed in existing installations as in new. This is primarily brought about by the fact that all such accessories are out of the pit above the floor level thereof.

In addition to the foregoing, the above-described valve and its manner of use in sump pits and the like provides for agitation of the liquids with each pumping action, as above controlled, to eliminate accumulations of sludge, thereby obviating the need for layup for cleaning operations.

The eccentric valve, per se, is adapted for other uses, as shut off or check valves, as well as flow-control valves, generally.

While the foregoing has illustrated and described what are now contemplated to be the best modes of carrying out the invention, the constructions are, of course, subject to modification without departing from the spirit and scope of the invention.

Having thus described the invention, what is claimed and desired to be secured by Letters Patent is:

1. An eccentric damper-type valve for controlled action comprising:
   a resilient ring seat disposed transversely in a passage for flow of fluid through the opening in said seat,
   a rotational shaft extending on an axis transverse to and offset from the axis of the opening in the ring seat,
   a valve vane of a size to close said seat opening in the ring seat to shut off flow in said passage, and
   said shaft extending from the vane with unequal portions of the latter on opposite sides of the shaft axis.

2. A valve according to claim 1 including an operating lever connected to said shaft for moving the valve vane between opened and closed positions.

3. A valve according to claim 2, in combination with:
   a similar, second eccentric damper-type valve located transversely in a second passage offset from and parallel to the first-mentioned passage and similarly provided with an operative lever, the axes of the two rotational shafts being parallel, and
   means interconnecting the operating levers of said two valves whereby upon operative movement of the vane of one valve, the vane of the other valve is moved.

4. The valve combination according to claim 3 in which the mentioned lever-connecting means comprises dashpot-controlled linkage to control the movement of one valve vane relative to the movement of the other valve vane.

5. The valve combination according to claim 4 in which the mentioned linkage comprises:
   a fluid-bypassing plunger pivotally connected to one of said operating levers, and a cylinder in which said plunger operates and containing the fluid which is bypassed from one side of the plunger to the other side causing the mentioned relative movements of valve vane.

6. A valve according to claim 2 in combination with:
   a fixed bracket, and
   dashpot means interconnecting the operating lever and said bracket for controlling the operative movement of the valve vane.

7. A valve combination according to claim 6 in which the dashpot means comprises:
   a fluid-bypassing plunger, and
   a cylinder in which said plunger operates and contains the fluid which is bypassed from one side of the plunger to the other side,
   said plunger and cylinder being each pivotally connected, one to the lever and the other to the bracket.

8. A valve combination according to claim 7 in which the plunger is pivotally connected to the lever and the cylinder to the bracket.

9. A valve combination according to claim 7 in which the bracket is adjustedly mounted for regulation of the valve vane movement.

* * * * *